United States Patent
Dorius et al.

(10) Patent No.: US 6,493,185 B1
(45) Date of Patent: Dec. 10, 2002

(54) OPTIMIZED PAD DESIGN FOR SLIDER AND METHOD FOR MAKING THE SAME

(75) Inventors: Lee K. Dorius, San Jose, CA (US); Ullal Vasant Nayak, San Jose, CA (US); Robert Nolan Payne, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 09/687,332

(22) Filed: Oct. 13, 2000

(51) Int. Cl.[7] .......................... G11B 5/60; G11B 21/21
(52) U.S. Cl. .................. 360/235.7; 360/234.9; 360/235.2; 360/236.5
(58) Field of Search .......................... 360/234.9, 235.1, 360/235.2, 235.3, 235.7, 236.5

(56) References Cited

U.S. PATENT DOCUMENTS

| | | |
|---|---|---|
| 4,777,544 A | 10/1988 | Brown et al. |
| 5,327,310 A | 7/1994 | Bischoff et al. |
| 5,488,524 A | 1/1996 | Cunningham |
| 5,617,273 A | 4/1997 | Carr et al. |
| 5,761,003 A | 6/1998 | Sato |
| 5,991,110 A * | 11/1999 | Sakai et al. .................. 360/119 |
| 6,040,965 A * | 3/2000 | Terunuma et al. .......... 360/122 |
| 6,198,600 B1 * | 3/2001 | Kitao et al. .............. 360/235.2 |

FOREIGN PATENT DOCUMENTS

EP          452846       * 10/1991

OTHER PUBLICATIONS

Yeack–Scranton et al., "An Active Slider For Practical Contact Recording," IEEE Transactions on Magnetics, vol. 26, No. 5, Sep. 1990, pp. 2478–2484.

* cited by examiner

Primary Examiner—David L. Ometz
(74) Attorney, Agent, or Firm—Altera Law Group, LLC

(57) ABSTRACT

The present invention provides an optimized pad design for a slider that minimizes the effect of mask alignment tolerances to allow for a more consistent N58 pad area and hence a more controllable burnish rate of the protruding pad. The protruding pad includes a first portion and a second portion formed by processing material to form the first and second portion wherein at least a quantity of the first portion comprises a first material type and the second portion comprises a second material type, the protruding pad further comprising a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

28 Claims, 8 Drawing Sheets

OPTIMIZED PAD DESIGN FOR SLIDER AND METHOD FOR MAKING THE SAME

BACKGROUND OF THE INVENTION

1. Field of the Invention

This invention relates in general to magnetic storage devices, and more particularly to an optimized pad design for a slider and a method for making the same.

2. Description of Related Art

Disk drives are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

Thin-film magnetic heads have been increasingly used, in place of conventional monolithic magnetic heads, as magnetic heads in magnetic disk apparatuses for recording and reproducing data so that the size of the heads may be reduced. Further, attempts have been made to minimize the distance between the magnetic head and the recording medium (the flying height) to realize a very dense recording format. It has been known since the early days of magnetic recording that minimizing the-head-disk spacing is desirable because the amplitude of the read signal from the disk increases with decreasing head-disk spacing. Higher recording densities can thus be achieved.

In conventional magnetic recording disk drives, the head carrier is an air-bearing slider that rides on a bearing of air above the disk surface when the disk is rotating at its operational speed. The slider is maintained next to the disk surface by a relatively fragile suspension that connects the slider to the actuator. The slider is either biased toward the disk surface by a small spring force from the suspension, or is "self-loaded" to the disk surface by means of a "negative-pressure" air-bearing surface on the slider. Contact start/stop (CSS) disk drives operate with the slider in contact with the disk surface during start and stop operations when there is insufficient disk rotational speed to maintain the air bearing. In a magnetic disk apparatus using magnetic disks having a relatively small diameter and thus a relatively low peripheral speed, proposals have been made in which magnetic head does not levitate above the recording medium but normally contacts the recording medium and has a sliding engagement therewith. In such a case, the thin-film magnetic head is fabricated such that the supporting base structure of the magnetic head with the slider or the contact pad thereof is very light in weight and is biased with a relatively small elastic force so that the contact pressure of the magnetic head with the magnetic recording medium is small.

Accordingly, improved magnetic data recording may be achieved by having a magnetic recording head in close proximity to a moving magnetic recording disk. In the contact type magnetic heads, it is desired that the pole which normally contacts the magnetic recording medium is wear-resistant. The contact pad surrounds the distal end of the pole, and the wear of the pole is mitigated if the wear of the contact pad is small. Accordingly, it is preferable to make the contact pad from a material harder than a material of the base structure of the magnetic head. This may be accomplished using a protruding pad that extends the magnetic recording head to the surface of the magnetic recording disk which wears to just make contact with the disk surface.

A protruding pad may be formed over the region of the magnetic recording head. The protruding pad generally includes the alumina overcoat material sputtered during fabrication of the magnetic recording head and some part of the ceramic surface of the slider, which is typically made of a $TiC/Al_2O_3$ composite that is referred to as N58. The protruding pad has to wear at a controllable rate and that is accomplished by controlling the area of the N58. The $TiC/Al_2O_3$ composite area, or N58, wears slowly, whereas the $Al_2O_3$ wears within minutes to it's asymptotic value.

However, during the process of forming the protruding pad, a photoresist mask must be aligned over the surface of the slider material so that material around the pad may be removed. Nevertheless, the alignment of the photoresist masks is difficult to control accurately. Thus, the area of the N58 in the pad is difficult to control. Yet, the inability to accurately control the area of the N58 in the pad causes the burnish rate of the protruding pad to vary. The wear rate will vary because the wear rate is very sensitive to the amount of the N58 area and the mask alignment tolerances of 5 microns lead to a nominal pad of 8 microns having anywhere from 37% to 162% of the required amount of N58. If the desired amount of pad area in N58 is smaller, e.g., 2 microns, then the error becomes unacceptably large.

It can be seen that there is a need for an optimized pad design for a slider that minimizes the effect of mask alignment tolerances to allow for a more consistent N58 pad area and hence a more controllable burnish rate of the protruding pad.

SUMMARY OF THE INVENTION

To overcome the limitations in the prior art described above, and to overcome other limitations that will become apparent upon reading and understanding the present specification, the present invention discloses an optimized pad design for a slider that minimizes the effect of mask alignment tolerances to allow for a more consistent N58 pad area and hence a more controllable burnish rate of the protruding pad.

The present invention solves the above-described problems by using a pad area that can more easily be controlled and kept to an area that can burnish in a reasonable length of time acceptable for the file manufacturing process.

A protruding pad in accordance with the principles of the present invention includes a first portion and a second portion formed by processing material to form the first and second portion wherein at least a quantity of the first portion includes a first material type and the second portion includes a second material type, the protruding pad further including a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

Other embodiments of a protruding pad in accordance with the principles of the invention may include alternative or optional additional aspects. One such aspect of the present invention is that the second material is a hard material and the first material is softer than the second material.

Another aspect of the present invention is that the first material includes aluminum oxide and the second material includes a composite of titanium carbide and aluminum oxide.

Another aspect of the present invention is that the surface area of the material of the second type is substantially constant and provides a predictable burnish rate.

Another aspect of the present invention is that the first portion includes a narrow vertical part and the second portion includes a horizontal part such that the first and second portions converge to form a generally T formation.

Another aspect of the present invention is that the first portion is flared to prevent debris collecting at the middle of the second portion from crossing the elements when the slider flies at various skew angles.

Another aspect of the present invention is that the horizontal part includes a width and a depth, wherein the width may be decreased and the depth increased in a manner such that the surface area of the material of the second type remains substantially constant.

In another embodiment of the present invention a slider arrangement for supporting an magnetic transducer in operative relation to a flexible moving recording medium is provided. The slider arrangement includes a support surface of a substantially rectangular shape to be disposed in opposed relation to a rotating magnetic disk, an air inflow end, an air outflow end, at least one air bearing surface formed on the support structure, wherein the at least one air bearing surface includes a rear pad, a magnetic transducer provided at the rear pad disposed in the vicinity of the air outflow end and a protruding pad on a slider rising above the slider surface and surrounding a distal end of magnetic elements of the magnetic transducer, wherein the protruding pad includes a first portion and a second portion formed by processing material to form the first and second portion wherein at least a quantity of the first portion includes a first material type and the second portion includes a second material type, the protruding pad further including a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

In another embodiment of the present invention a magnetic disk device is provided. The magnetic disk includes a rotating magnetic disk, a rotary actuator including a pivotally-movable carriage, a suspension mounted on a distal end of the carriage and a slider arrangement for supporting an magnetic transducer in operative relation to a flexible moving recording medium, the slider arrangement including a support surface of a substantially rectangular shape to be disposed in opposed relation to a rotating magnetic disk, an air inflow end, an air outflow end, at least one air bearing surface formed on the support structure, wherein the at least one air bearing surface includes a rear pad, a magnetic transducer provided at the rear pad disposed in the vicinity of the air outflow end and a protruding pad on a slider rising above the slider surface and surrounding a distal end of magnetic elements of the magnetic transducer, wherein the protruding pad includes a first portion and a second portion formed by processing material to form the first and second portion wherein at least a quantity of the first portion includes a first material type and the second portion includes a second material type, the protruding pad further including a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

In another embodiment of the present invention a plurality of sliders is formed having a protruding pad, wherein each protruding pad rises above a slider surface and surrounds a distal end of magnetic elements of a magnetic transducer, wherein each protruding pad includes a first portion and a second portion formed by processing material to form the first and second portion wherein at least a quantity of the first portion includes a first material type and the second portion includes a second material type, each protruding pad further including a boundary interface separating the first material type from the second material type, the boundary interface having a position that varies on each protruding pad among the plurality of sliders according to an alignment tolerance for the processing and that defines a surface area for the material of the second type for each protruding pad, wherein the surface area of the material of the second type for each protruding pad is negligibly affected by variation of the position of the boundary interface on each protruding pad among the plurality of sliders.

In another embodiment of the present invention a method of forming a protruding pad on a slider rising above the slider surface and surrounding a distal end of magnetic elements of a magnetic transducer is provided. The method includes forming a slider structure including a first type of material and a second type of material, wherein the first type of material and the second type of material are separated by a boundary interface, and wherein magnetic elements of a magnetic transducer are formed within the material of the first type and removing the first type of material and the second type of material from around a first portion and a second portion of a protruding pad, wherein the removing includes an alignment tolerance that the first portion and the second portion are aligned within on the slider over the boundary interface, wherein the removing further includes shaping the first portion and the second portion such that the boundary interface is positioned according to the alignment tolerance on the first portion such that the surface area of the material of the second type is negligibly affected by the position of the boundary interface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an optimized pad design for a slider that minimizes the effect of mask alignment tolerances to allow for a more consistent N58 pad area and hence a more controllable burnish rate of the protruding pad. A pad area is used that allows the resulting tolerances of the pad area to be more easily controlled and thereby kept to an area that can burnish in a reasonable length of time that is acceptable for the file manufacturing process.

Figure 1:
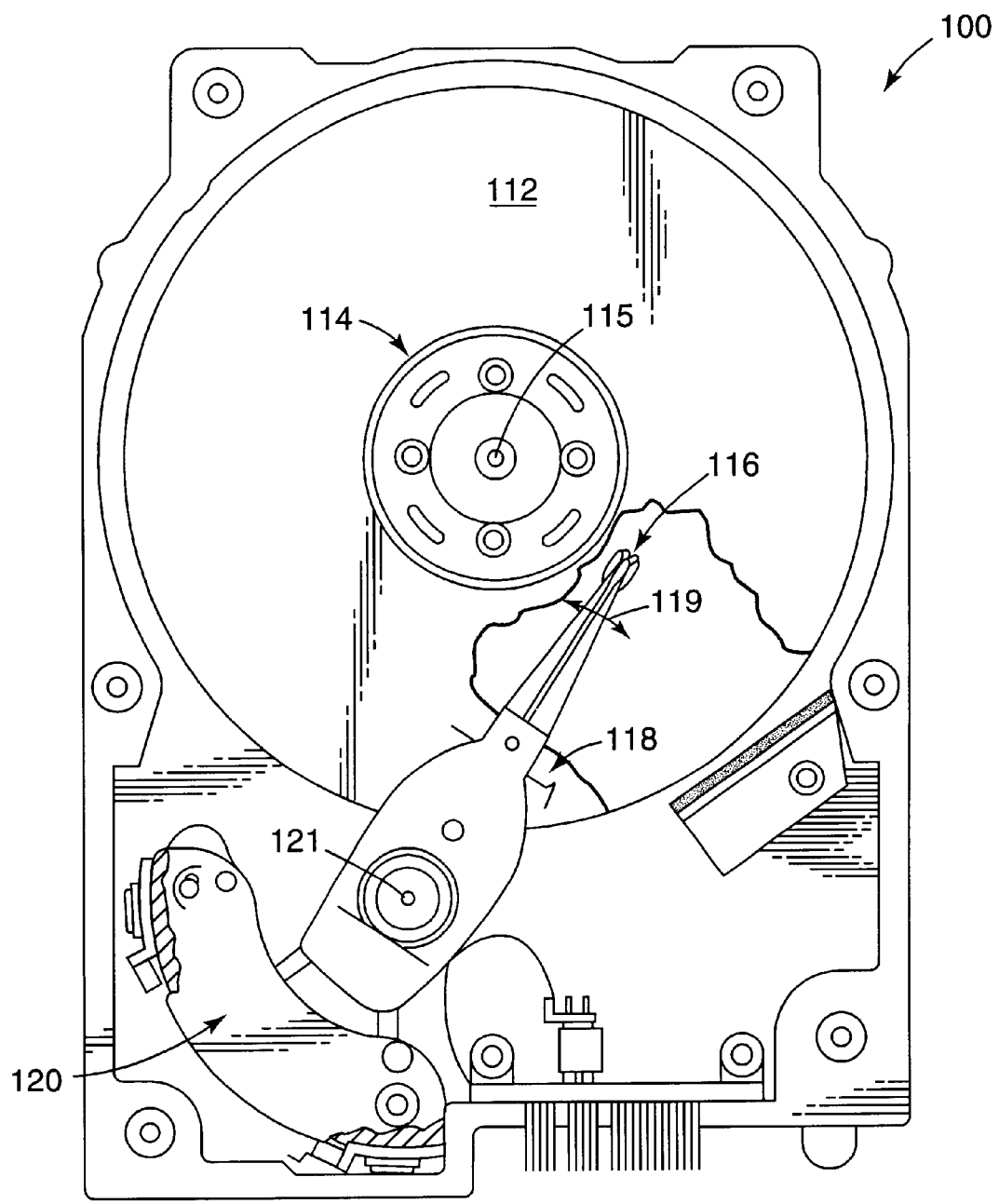
FIG. 1 is a plan view of a disk drive according to the present invention.

FIG. 1 is a plan view of a disk drive 100 according to the present invention. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to an actuator assembly 118 in disk drive 100. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disk surfaces, under the control of electronic circuitry housed within disk drive 100.

More specifically, actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

Figure 2:
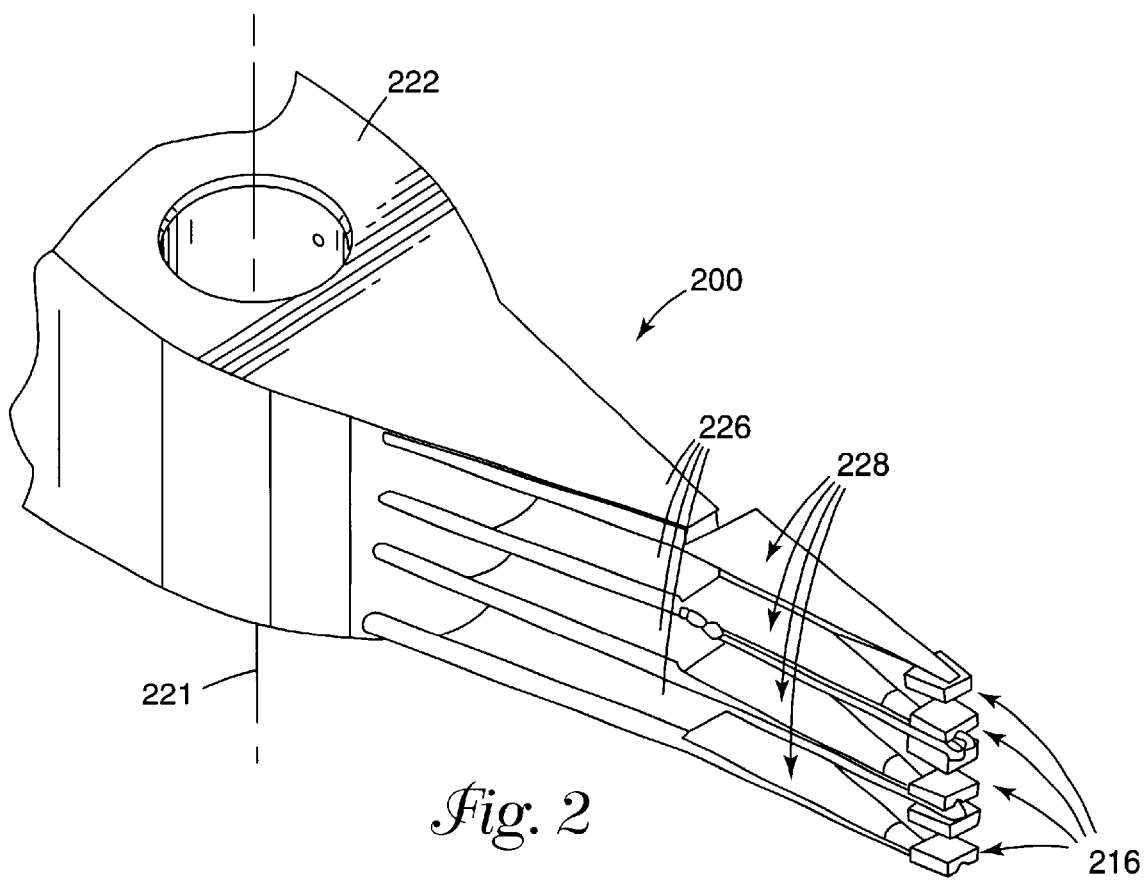
FIG. 2 is a perspective view of actuator assembly.

FIG. 2 is a perspective view of actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216.

Figure 3:
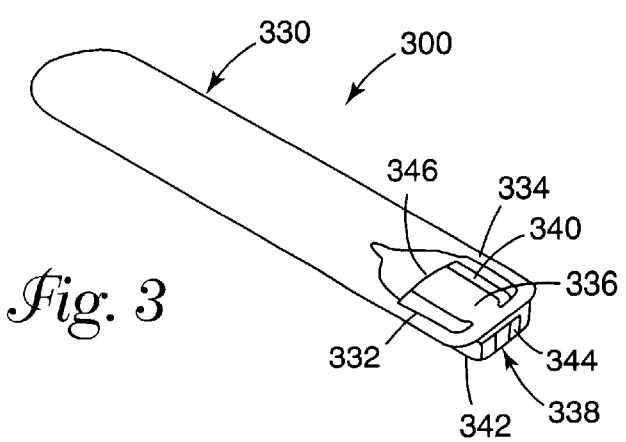
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a trailing edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

Figure 4:
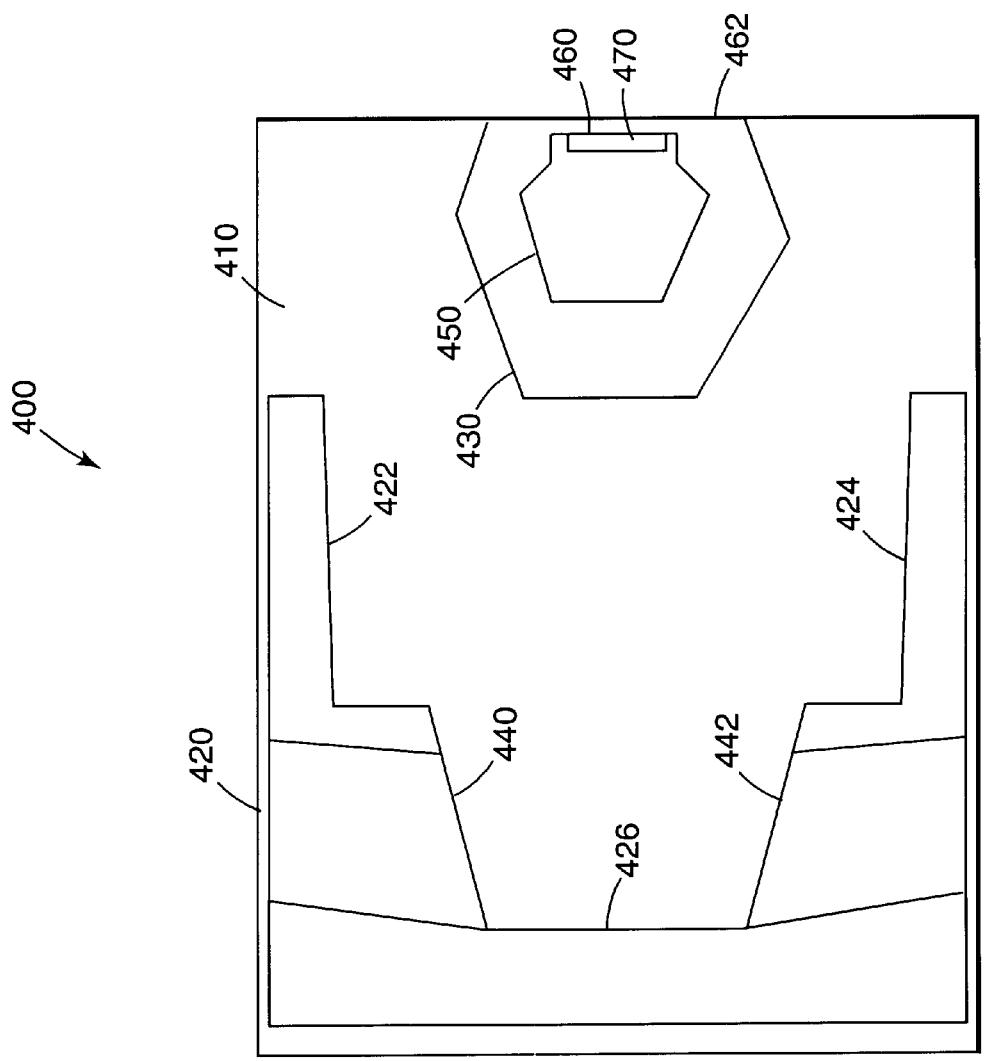
FIG. 4 illustrates one embodiment of a conventional slider design.

FIG. 4 illustrates one embodiment of a conventional slider design 400. In FIG. 4, the slider 400 includes a first slider surface 410 at a first level. On the first slider surface 410, front air bearing surfaces 420 are formed including two side rails 422, 424 and a crossbar 426. Also, a rear air bearing surface 430 is formed at the rear of the slider. Two raised front air bearing pads 440, 442 are formed respectively on the two side rails 422, 424. A raised rear pad 450 is formed on the rear air bearing surface 430.

A magnetic head 460 is also shown formed in FIG. 4 at the trailing edge 462 of the rear pad 450. A protruding pad 470 is used to extend the magnetic head 460 toward the surface of the disk. The protruding pad 470 is used to provide a wear surface that provides the contact surface with the disk. The details of the protruding pad 470 of FIG. 4 are shown in greater detail in FIG. 5.

Figure 5:
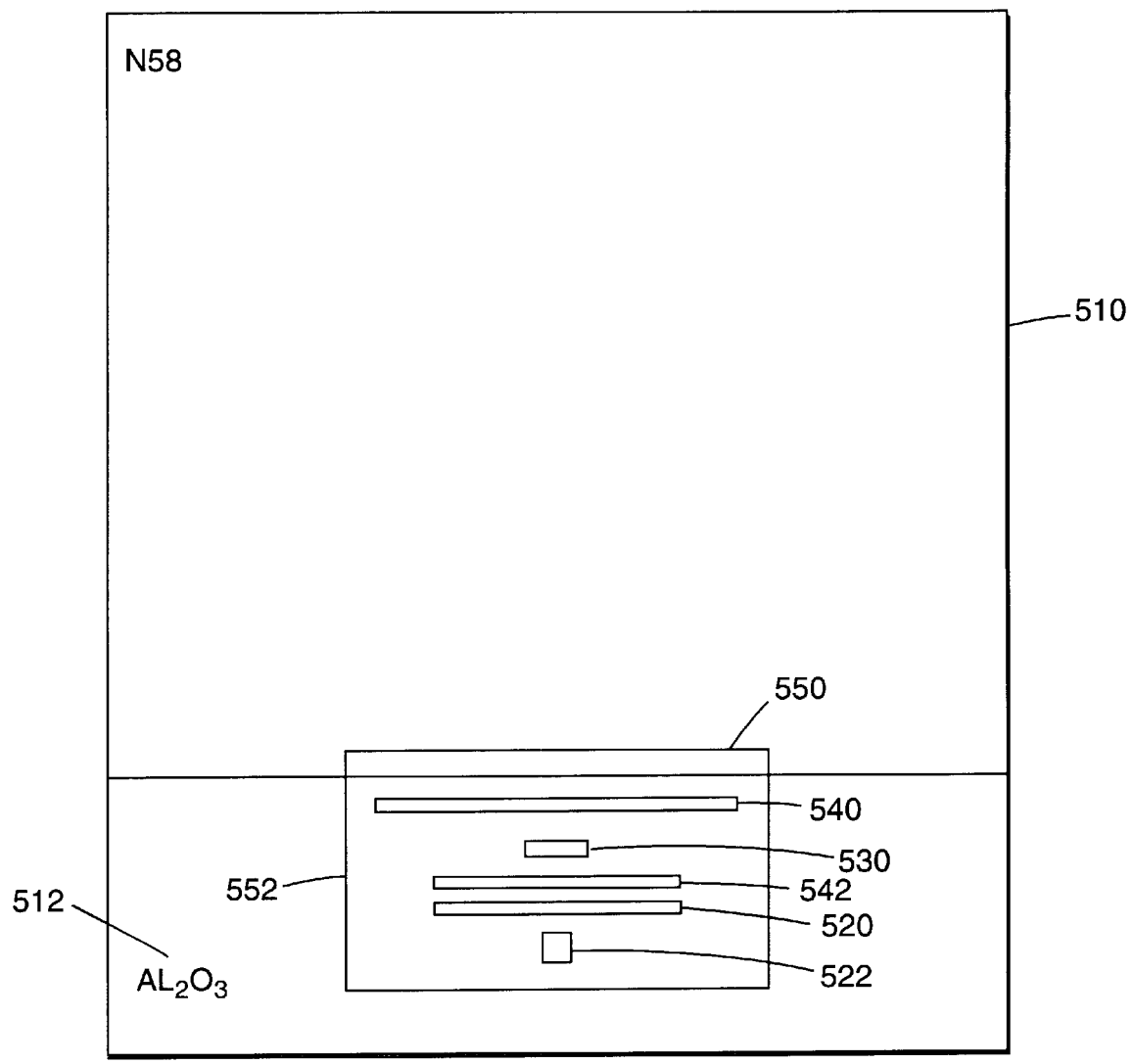
FIG. 5 illustrates a conventional protruding pad.

FIG. 5 illustrates a conventional protruding pad 500. In FIG. 5, the protruding pad 500 is positioned along the interface between the $TiC/Al_2O_3$ composite section, i.e., N58, 510 and the $Al_2O_3$ section 512. The protruding pad 500 can range in height from 15–100 nm higher than the N58/$Al_2O_3$ surface. The conventional protruding pad 500 extends the magnetic elements, such as the first 520 and second 522 pole tips, the MR sensor 530 and the first 540 and the second 542 shields toward the disk surface.

The protruding pad 500 has to wear at a controllable rate and that is accomplished by controlling the surface area of the N58 section of the protruding pad 500. The $TiC/Al_2O_3$ composite area, or N58 section 550, wears slowly, whereas the $Al_2O_3$ section 552 of the protruding pad 500 wears within minutes to it's asymptotic value. However, during the process of forming the protruding pad 500, a photoresist mask must be aligned over the surface of the slider material so that material around the protruding pad 500 may be removed. Nevertheless, the alignment of the photoresist masks is difficult to control accurately because of alignment tolerances. Thus, the area of the N58 section 550 of the protruding pad 500 is difficult to control. Yet, the inability to accurately control the area of the N58 section 550 of the pad causes the burnish rate of the protruding pad to vary. The wear rate will vary because the wear rate is very sensitive to the amount of the N58 area 550 and the mask alignment tolerances of 5 microns lead to a nominal pad of 8 microns having anywhere from 37% to 162% of the required amount of N58. If the area of the N58 section 550 is desired to be smaller, e.g., 2 microns, then the error becomes unacceptably large.

Figure 6:
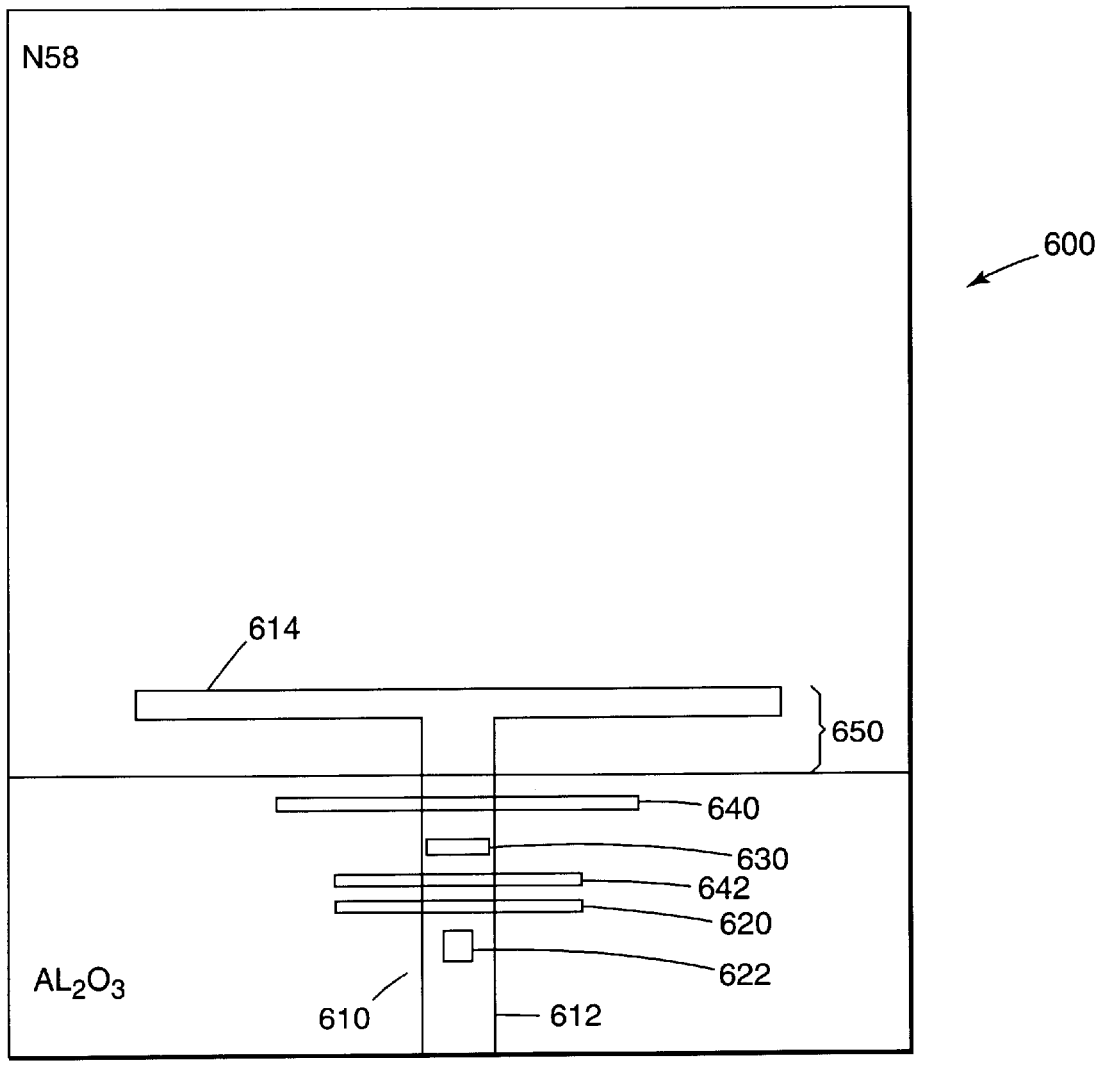
FIG. 6 illustrates one embodiment of an optimized pad design for a slider according to the present invention.

FIG. 6 illustrates one embodiment of an optimized pad design 600 for a slider according to the present invention. The optimized pad design 600 according to the present invention minimizes the effect of mask alignment tolerances to allow for a more consistent N58 pad area 650 and hence a more controllable burnish rate of the protruding pad 610.

In FIG. 6, the protruding pad 610 extends the magnetic elements, such as the first 620 and second 622 pole tips, the MR sensor 630 and the first 640 and the second 642 shields toward the disk surface. The protruding pad 610 comprises a first portion 612 and a second portion 614. The protruding pad 610 may be generally "T-shaped" with the only constraint on the first portion 612 of the protruding pad is that the first portion 612 has to cover the magnetic elements including the leads of the MR/GMR stripe. A width of 50 microns will leave a 13 microns margin for mask misalignments in the lateral dimension.

At least a quantity of the first portion 612 comprises $Al_2O_3$. The rest of the first portion 612 may be N58 650 or the boundary 656 may be positioned, depending upon alignment, where the second portion 614 and the first portion 612 converge. Thus, the N58 area 650 is maintained substantially constant, i.e., the N58 surface area of the protruding pad 600 is negligibly affected by the position of the boundary interface, even with some misalignment. The second portion 614 of the protruding pad can be made as small as 2 microns and if the second portion 614 of the protruding pad is spaced more than 5 microns from the $N58/Al_2O_3$ boundary 656 the N58 area 650 remains substantially the same even with mask misalignments of 5 microns.

Figure 7:
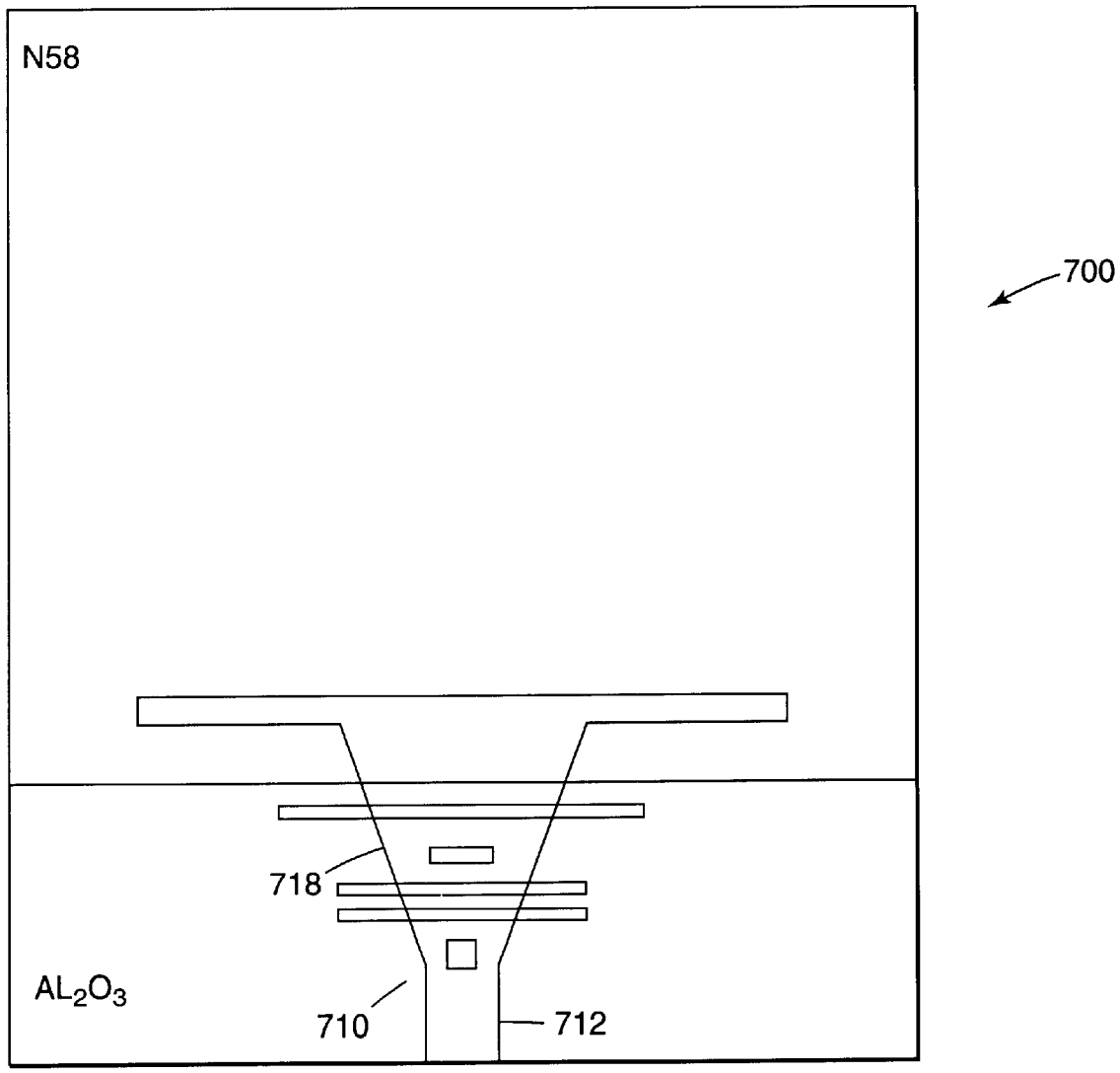
FIG. 7 illustrates a second embodiment of an optimized pad design for a slider according to the present invention.

FIG. 7 illustrates a second embodiment of an optimized pad design 700 for a slider according to the present invention. In FIG. 7, the protruding pad 710 is modified so that the vertical leading end 712 of the protruding pad is flared 716. The flaring 716 of the first portion 712 of the protruding pad prevents debris collecting at the middle of the protruding pad from crossing the elements when the slider flies at various skew angles.

Figure 8:
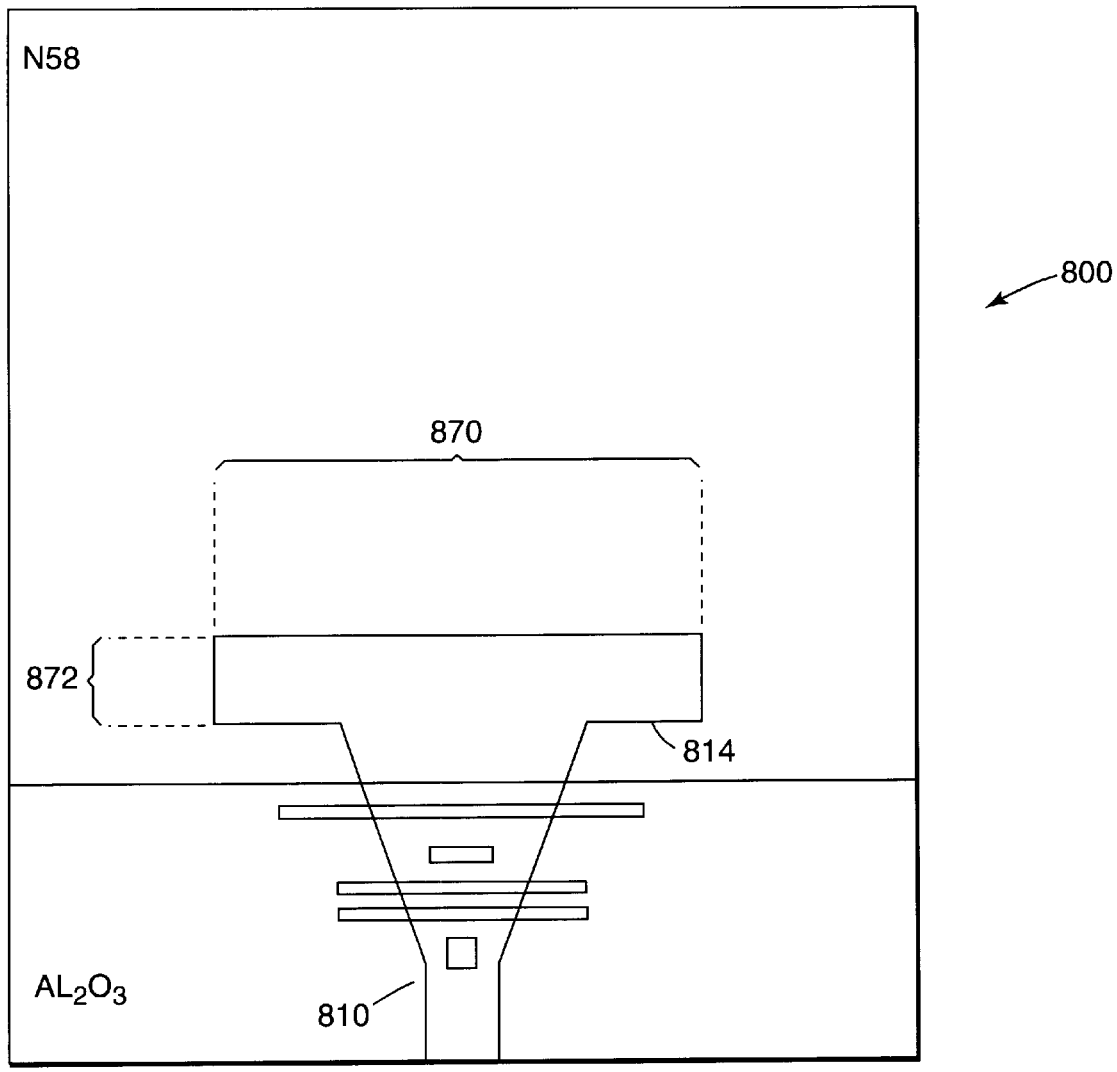
FIG. 8 illustrates a third embodiment of an optimized pad design for a slider according to the present invention.

FIG. 8 illustrates a third embodiment of an optimized pad design 800 for a slider according to the present invention. In FIG. 8, the width 870 of the second portion 814 of the pad 810 is reduce to minimize the roll sensitivity of the pad 810. The front to back thickness dimension 872 of the pad 810 is correspondingly increased to keep the N58 pad area 850 substantially constant at some optimal area best suited for a controllable burnish.

Figure 9:
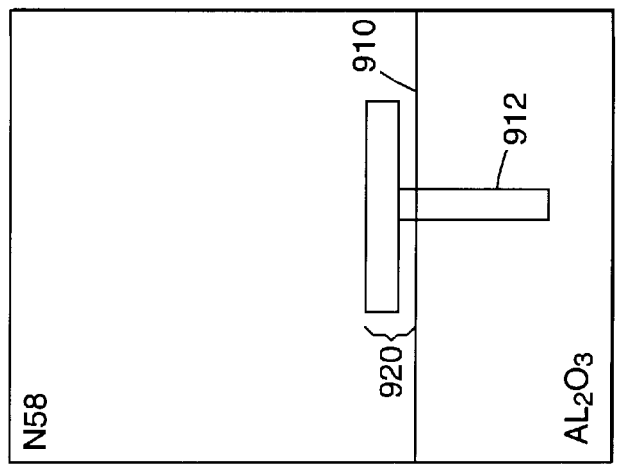
FIG. 9 illustrates protruding pads of a row of sliders formed according to the present invention.
Figure 9:
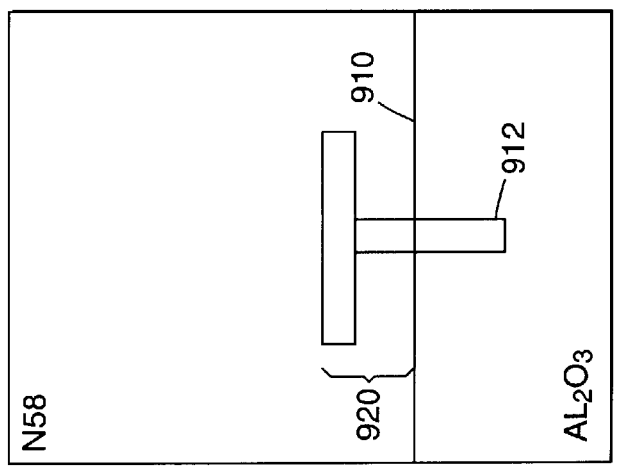
Figure 9:
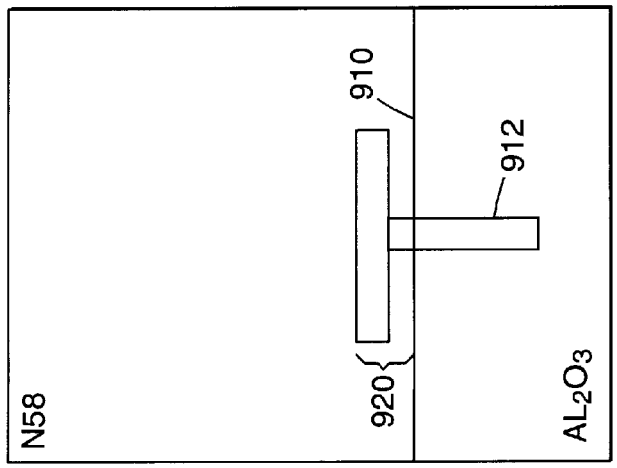

FIG. 9 illustrates protruding pads of a row of sliders 900 formed according to the present invention. In FIG. 9, the boundary interface 910 for each protruding pad varies relative to where the vertical part 912 is intersected according to the alignment tolerance. Yet, the surface area 920 each portion of the protruding pad that comprises N58 is negligibly affected by the variation of the alignment of the protruding pad relative to the boundary interface 910.

Thus, the present invention provides an optimized pad design for a slider, wherein a pad area is used that allows the resulting tolerances of the pad area to be more easily controlled and thereby kept to an area that can burnish within a time period that is acceptable for the file manufacturing process. By adjusting the slider design, the burnishing rate for a slider can be controlled.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A protruding pad on a slider rising above the slider surface and surrounding a distal end of magnetic elements of a magnetic transducer, the protruding pad comprising a first portion and a second portion formed by processing material to form the first and second portion wherein at least a quantity of the first portion comprises a first material type and the second portion comprises a second material type, the protruding pad further comprising a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

2. The protruding pad of claim 1 wherein the second material is a hard material and the first material is softer than the second material.

3. The protruding pad of claim 1 wherein the first material comprises aluminum oxide and the second material comprises a composite of titanium carbide and aluminum oxide.

4. The protruding pad of claim 1 wherein the surface area of the material of the second type is substantially constant and provides a predictable burnish rate.

5. The protruding pad of claim 1 wherein the first portion comprises a narrow vertical part and the second portion comprises a horizontal part such that the first and second portions converge to form a generally T formation.

6. The protruding pad of claim 5 wherein the first portion is flared to prevent debris collecting at the middle of the second portion from crossing the elements when the slider flies at various skew angles.

7. The protruding pad of claim 5 wherein the horizontal part includes a width and a depth, wherein the width is decreased and the depth increased in a manner such that the surface area of the material of the second type remains substantially constant.

8. A slider arrangement for supporting a magnetic transducer in operative relation to a flexible moving recording medium, the slider arrangement comprising:

a support surface of a substantially rectangular shape to be disposed in opposed relation to a rotating magnetic disk;

an air inflow end;

an air outflow end;

at least one air bearing surface formed on the support surface, wherein the at least one air bearing surface comprises a rear pad;

a magnetic transducer provided at the rear pad disposed in the vicinity of the air outflow end; and a protruding pad rising above the support surface and surrounding a distal end of magnetic elements of the magnetic transducer, wherein the protruding pad comprises:

a first portion and a second portion formed by processing material to form the first and second portion wherein at least a quantity of the first portion comprises a first material type and the second portion comprises a second material type, the protruding pad further comprising a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

9. The slider arrangement of claim 8 wherein the second material is a hard material and the first material is softer than the second material.

10. The slider arrangement of claim 8 wherein the first material comprises aluminum oxide and the second material comprises a composite of titanium carbide and aluminum oxide.

11. The slider arrangement of claim 8 wherein the surface area of the material of the second type is substantially constant and provides a predictable burnish rate.

12. The slider arrangement of claim 8 wherein the first portion comprises a narrow vertical part and the second portion comprises a horizontal part such that the first and second portions converge to form a generally T formation.

13. The slider arrangement of claim 12 wherein the first portion is flared to prevent debris collecting at the middle of the second portion from crossing the elements when the slider flies at various skew angles.

14. The slider arrangement of claim 12 wherein the horizontal part includes a width and a depth, wherein the width is decreased and the depth increased in a manner such that the surface area of the material of the second type remains substantially constant.

15. A magnetic disk device comprising:
a rotating magnetic disk;
a rotary actuator comprising a pivotally-movable carriage;
a suspension mounted on a distal end of the carriage; and
a slider arrangement for supporting a magnetic transducer in operative relation to a flexible moving recording medium, the slider arrangement comprising:
a support surface of a substantially rectangular shape to be disposed in opposed relation to a rotating magnetic disk;
an air inflow end;
an air outflow end;
at least one air bearing surface formed on the support surface, wherein the at least one air bearing surface comprises a rear pad;
a magnetic transducer provided at the rear pad disposed in the vicinity of the air outflow end; and
a protruding pad rising above the support surface and surrounding a distal end of magnetic elements of the magnetic transducer, wherein the protruding pad comprises:
a first portion and a second portion formed by processing material to form the first and second portion wherein at least a quantity of the first portion comprises a first material type and the second portion comprises a second material type, the protruding pad further comprising a boundary interface separating the first material type from the second material type, the boundary interface having a position on the first portion that is dependent upon an alignment tolerance for the processing and that defines a surface area for the material of the second type, wherein the surface area of the material of the second type is negligibly affected by the position of the boundary interface.

16. The magnetic disk device of claim 15 wherein the second material is a hard material and the first material is softer than the second material.

17. The magnetic disk device of claim 15 wherein the first material comprises aluminum oxide and the second material comprises a composite of titanium carbide and aluminum oxide.

18. The magnetic disk device of claim 15 wherein the surface area of the material of the second type is substantially constant and provides a predictable burnish rate.

19. The magnetic disk device of claim 15 wherein the first portion comprises a narrow vertical part and the second portion comprises a horizontal part such that the first and second portions converge to form a generally T formation.

20. The magnetic disk device of claim 19 wherein the first portion is flared to prevent debris collecting at the middle of the second portion from crossing the elements when the slider flies at various skew angles.

21. The magnetic disk device of claim 19 wherein the horizontal part includes a width and a depth, wherein the width is decreased and the depth increased in a manner such that the surface area of the material of the second type remains substantially constant.

22. A plurality of sliders formed each having a protruding pad, wherein each protruding pad rises above a slider surface and surrounds a distal end of magnetic elements of a magnetic transducer, each protruding pad comprising a first portion and a second portion formed by processing material to form the first and second portion wherein at least a quantity of the first portion comprises a first material type and the second portion comprises a second material type, each protruding pad further comprising a boundary interface separating the first material type from the second material type, the boundary interface having a position that varies on each protruding pad among the plurality of sliders according to an alignment tolerance for the processing and that defines a surface area for the material of the second type for each protruding pad, wherein the surface area of the material of the second type for each protruding pad is negligibly affected by variation of the position of the boundary interface on each protruding pad among the plurality of sliders.

23. The plurality of sliders of claim 22 wherein the second material is a hard material and the first material is softer than the second material.

24. The plurality of sliders of claim 22 wherein the first material comprises aluminum oxide and the second material comprises a composite of titanium carbide and aluminum oxide.

25. The plurality of sliders of claim 22 wherein the surface area of the material of the second type is substantially constant and provides a predictable burnish rate.

26. The plurality of sliders of claim 22 wherein the first portion comprises a narrow vertical part and the second portion comprises a horizontal part such that the first and second portions converge to form a generally T formation.

27. The plurality of sliders of claim 26 wherein the first portion is flared to prevent debris collecting at the middle of the second portion from crossing the elements when the slider flies at various skew angles.

28. The plurality of sliders of claim 26 wherein the horizontal part includes a width and a depth, wherein the width is decreased and the depth increased in a manner such that the surface area of the material of the second type remains substantially constant.

* * * * *